June 7, 1960

V. DURBIN 2,939,606

COOKING UTENSIL

Filed Dec. 23, 1953

INVENTOR.
VERNON DURBIN

BY *James and Franklin*

ATTORNEY

United States Patent Office 2,939,606
Patented June 7, 1960

2,939,606

COOKING UTENSIL

Vernon Durbin, Waban, Mass., assignor to National Pneumatic Co., Inc., Boston, Mass., a corporation of Delaware Filed Dec. 23, 1953, Ser. No. 399,975

12 Claims. (Cl. 220—63)

The present invention relates to an improvement in cooking utensils.

Manual cleaning of pots and pans is a household chore which, thus far, has not capitulated to the advance of technology. Dishes and glasses may be placed in a washing machine and satisfactorily cleansed. The same does not hold true of pots, pans, casseroles and the like, particularly those in which food has been baked or fried. The cooking residues unavoidably inherent in such operations are not readily removable, and yield only to prolonged scouring with special implements and materials.

A second all too frequent cooking difficulty is the tendency of baked products, such as cakes and pies, to stick to the pans in which they are baked and resist removal therefrom in one piece.

The use of aluminum foil or other thin metallic material as a lining for cooking utensils has been previously proposed. It has the advantage that the foil represents a disposable item upon which the cooking residues are deposited and which, when stripped from the utensil and thrown away, renders it unnecessary to clean the utensil at all. It has the further advantage that after baking the foil is more readily removable from the utensil together with its contents such as a cake, than the contents alone would have been in the absence of the foil.

Unfortunately, this procedure has proved satisfactory only in connection with a limited number of cooking operations. The drip-pan of a broiler may advantageously be lined with foil, and certain food items, such as potatoes to be baked or boiled, may be wrapped in foil before cooking. However, the use of foil as a liner for frying or baking pans, or in conjunction with any utensils to be used in a cooking operation in which heat is to be transmitted directly through the utensil to the food contained therein, has not been considered feasible.

The primary reason is that the foil sheet cannot manually be shaped to have a smooth, uniform fit within the utensil, in intimate contact with the entire inner surface thereof. It is extremely time-consuming and frustratingly futile, to attempt to snugly line a utensil with a sheet of foil. If the foil is not in uniform contact with the inner surface of the utensil, air pockets will exist between portions of the foil and the utensil, and those air pockets actually represent areas of thermal insulation. Thus the contents of the utensil will not be uniformly heated. Moreover, when it is necessary to stir the food within the utensil or lift it or turn it, as when scrambling or frying eggs, for example, the necessary movements of a spoon or spatula will tend to rupture the foil at the upwardly bulging areas thereof, thus destroying its utility as a utensil protector.

If an attempt is made to supply preformed inserts of fairly thin metal, each of a shape and size to fit a given utensil, a sufficiently accurate mating of the liner and utensil can be attained only when the material of which the liner is formed is sufficiently thick to have a substantial degree of inherent rigidity, and in such a case the cost of the liner would be so great that it could not be considered expendable. Moreover, different units would be required for each size and shape of utensil, thus further increasing the cost and reducing the adaptability of the arrangement.

According to the present invention, however, a utensil may be devised with which liners of thin foil can be employed for frying, baking and the like, without any of the disadvantages outlined above. Proper fitting of the foil within the utensil is achieved by sealing the liner to the utensil and then applying suction within the sealed space between the liner and the inner surface of the utensil so as to positively force the liner into intimate and uniform contact with the inner surface of the utensil. In this way the thinness and ready flexibility of the liner which is a necessary concomitant of its being sufficiently inexpensive to warrant disposability, far from detracting from its proper cooking function, as was the case in the past, is utilized to ensure that proper cooking takes place.

The same structure by means of which suction is applied to the sealing space between the liner and the utensil may also be utilized, after the cooking operation has been performed, to apply pressure against the outer surface of the liner and thus forcibly separate the liner from the utensil, thus preventing rupture of the thin foil in the event it might stick to the utensil and greatly facilitating its disposability.

To the accomplishment of the above, and to such other objects as may hereinafter appear, the present invention relates to the construction of a cooking utensil as defined in the appended claims and as described in this specification, taken together with the accompanying drawings in which:

Figure 1:
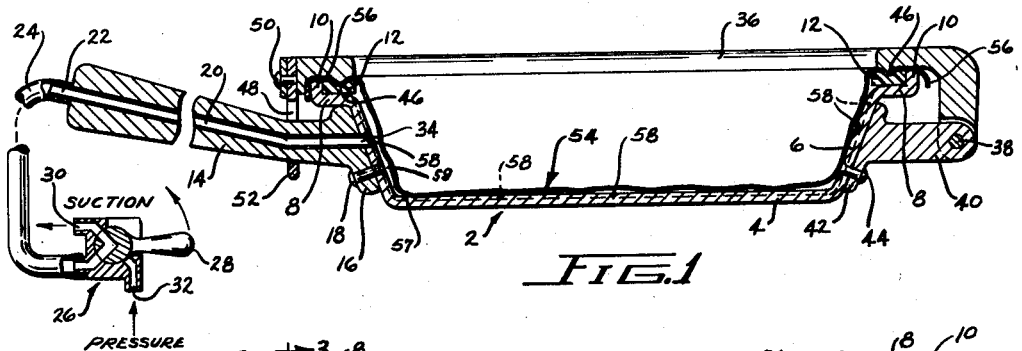
Fig. 1 is a side cross sectional view of one embodiment of the present invention, showing the liner in position but before suction has been applied.

The utensil of the present invention, generally designated 2, is here shown in the form of a frying pan, but it will be obvious that its particular shape or purpose may be widely varied therefrom. In the form shown in Figs. 1–3 the utensil comprises a bottom wall 4 and side walls 6 which terminate in an outwardly extending upper wall 8 having an upwardly extending outer rim flange 10, a sealing ring 12 of suitable material such as synthetic rubber resting on the wall 8 and preferably being secured in place by means of adhesive or the like. A handle 14 has a base plate 16 which is secured to a portion of the side wall 6 by means of rivets or the like 18. A hollow tube 20 passes through the handle 14, its outer end 22, which extends beyond the handle 14, having a flexible tube 24 fitted thereover, that tube 24 communicating with a valve 26 having a handle 28, the position of the handle determining whether the tube 24 is operatively connected to a suction source 30 or a pressure source 32. In the position shown in Fig. 1 operative connection to the suction source 30 is made. The source of suction and pressure may be a small motor-driven air pump of any conventional type having an air inlet and an air outlet, connection of the tube 24 to the air inlet giving rise to a suction effect and connection of the tube 24 to the air outlet giving rise to a pressure effect. The inner end 34 of the tube 20 passes through an aperture in the side wall 6 of the utensil so as to open onto the interior of the utensil.

A clamping ring 36 is pivotally mounted at 38 on an arm 40 extending out from the side wall 6 of the utensil 2, the arm 40 having a base plate 42 secured to the side wall 6 by means of rivets 44 or the like. The ring is provided with a circular downward projection 46 adapted to register with the sealing strip 12 when the ring 36 is pivoted to the closed position illustrated in Figs. 1 and 2. The arm 40 is shown as located diametrically opposite the handle 14, and the ring 36 is provided, in registration with the handle 14, with a clamping hook 48 pivotally mounted at 50 and having a tongue 52 adapted, when swung in a counter-clockwise direction as viewed in Fig. 3, to engage the underside of the handle 14 and, with a camming action, to pull downwardly the end of the ring 36 to which it is attached, thus causing the circular projection 46 to bite into the sealing ring 12. While the clamping element 36 is here shown as a ring leaving the top of the utensil 2 open, it could also take the form of a complete lid, with or without an air vent. Thus the present invention could even be used to protect the inner surfaces of conventional pressure cookers.

The liner, generally designated 54, may be formed of any suitable material, such as thin aluminum foil, preferably having a thickness of .002 inch or less in order that its cost may be minimized. A sheet of this material of suitable size is preliminarily and approximately formed into the shape of the interior of the utensil 2, the edges thereof being crinkled in a manner comparable to the edges of paper drinking cups in common use in order to achieve the desired circular peripheral configuration. The upper edge thereof, designated by the reference numeral 56, is flattened so that it will fit over the sealing strip 12 when the liner 54 is dropped into the utensil. If desired, the top edge 56 of the liner may be folded back on itself in order to impart a greater degree of rigidity to the liner. After the liner has been dropped into place, the clamping ring 36 having first been swung away from the upper edge of the utensil, the ring 36 is then moved back into its operative position shown in Figs. 1 and 2, the hook 48 is caused to engage the handle 14, the circular protrusion 46 seals the top edge 56 of the liner 54 against the sealing strip 12, and the relative position of the parts shown in Fig. 1 results. With reference to Fig. 1, it may be mentioned that the lack of conformity of the liner 54 to the inner surface of the utensil 2 is somewhat exaggerated for purposes of illustration, and in actual use it is entirely feasible to pre-shape the liner so that it will conform somewhat more closely to the interior of the utensil 2.

Figure 2:
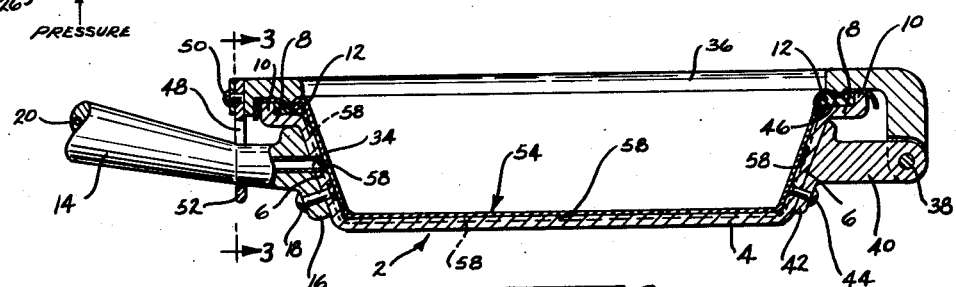
Fig. 2 is a view similar to Fig. 1 but showing the condition of the liner after suction has been applied.

Next suction is applied through the tubes 24 and 22, this suction evacuating the space 59 between the liner 54 and the utensil walls 4 and 6, that space being sealed at its top by the ring 24, liner edge 56 and protrusion 46. With such evacuation atmospheric pressure active on the exposed surface of the liner 54 will cause the liner to adhere closely and uniformly to the inner surfaces of the utensil walls 4 and 6, as shown in Fig. 2. If the liner 54 is properly shaped it is progressively pressed against the utensil walls 4 and 6 from the center out. Thereafter the application of suction may be discontinued and the lined utensil can be used in any desired manner, or, if desired, suction may be left on during cooking. An automatic switch could be employed to turn off the motor for the suction pump after the space 57 has been fully exhausted.

In order to ensure substantially uniform application of suction over the entire liner-utensil interface, a series of communicating grooves 58, preferably V-shaped in cross section, may be provided on the inner surface of the utensil walls 4 and 6, those grooves 58 communicating with the inner end 34 of the tube 20. The width of these grooves must be sufficiently small in relation to the nature of the material of which the liner 54 is formed so that the application of suction will not cause the liner 54 to enter and plug any of those grooves. A rule of thumb is that the grooves should be only about three times as wide as the liner is thick.

Because the liner 54 snugly and uniformly engages the inner surface of the utensil walls 4 and 6, heat will be transferred through the liner 54 uniformly over its entire area, and the contents of the utensil will be properly cooked. For the same reason, the cooked contents may be stirred or lifted without danger of rupture of the liner 54, even though it may be formed of thin and fragile material. It may also be noted that since the liner edge 56 covers the sealing strip 12 it prevents grease or the like from reaching the strip 12 and deteriorating it.

After the cooking operation has been completed the food may be removed from the liner 54 while it is still in position in the utensil 2, the liner 54 later being removed and discarded, or the food and liner 54 may be removed from the utensil as a unit. In either event when the liner 54 is to be removed the hook 48 is disengaged from the handle 14, the ring 36 is swung to inoperative position, the top edges 56 of the liner 54 are lifted from the sealing ring 12, and the liner is thus removed. In order to facilitate separation of the liner 54 from the utensil 2, the valve 28 may be shifted so as to connect the tube 24 to the pressure source 32, air then being pumped between the liner 54 and the utensil walls 4 and 6 so as to positively separate the liner 54 from the utensil 2. This is important where the liner 54 may tend to stick to the utensil walls 4 and 6, in which case lifting the liner 54 by its edge 56 may cause it to rupture and spill its contents onto the utensil walls 4 and 6, which it is the objective of the liner 54 to avoid.

In some instances the top liner edge 56 has tended to stick to the sealing strip 12, especially when the latter is formed of synthetic rubber. This sticking tendency has been found to be substantially eliminated by coating the upper surface of the sealing strip 12 with a thin layer of tetrafluoroethylene.

Figures 3, 6:
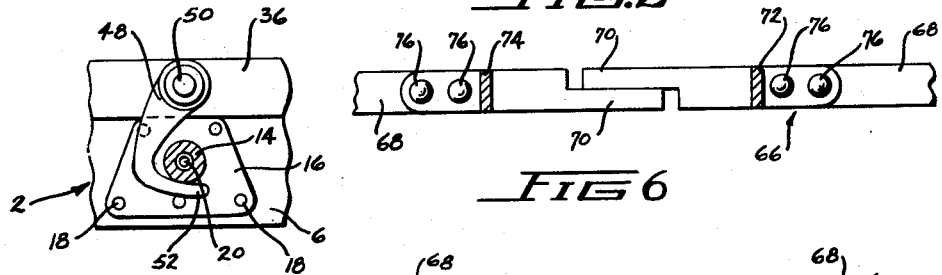
Fig. 3 is a detail view taken along the line 3—3 of Fig. 2.
Fig. 6 is a cross sectional view taken along the line 6—6 of Fig. 5.
Figures 4, 5:
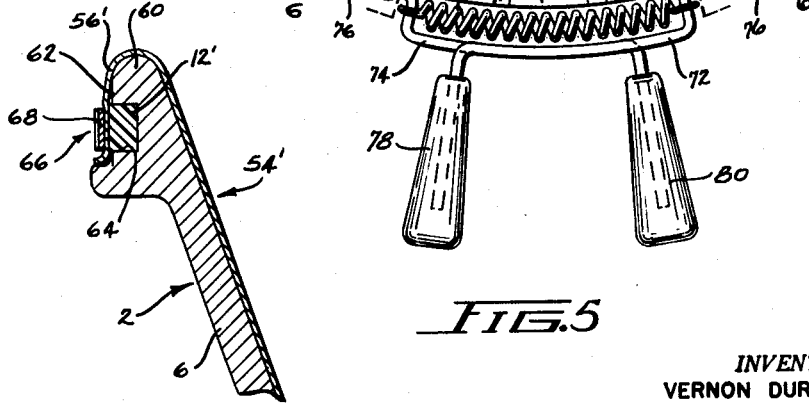
Fig. 4 is a detail cross sectional view showing another embodiment of the present invention.
Fig. 5 is a detail top plan view of a portion of the split ring employed with the embodiment of Fig. 4 for sealing purposes.

Many different ways of sealing the space 57 may be employed. A bayonet joint between sealing ring 36 and utensil 2, of the type found in many pressure cookers, is quite effective. Another structure is shown in Figs. 4–6, where the side wall 6 of the utensil terminates in an upper rim 60 having a substantially vertical outer surface 62 with a groove 64 formed therein, the sealing strip 12' being received within the groove 64. The top edge 56' of the liner 54', in this embodiment, is bent around the rim 60 so as to lie alongside the outer surface of the sealing ring 12'. This has the advantage that the liner 54', when initially shaped, has an increased degree of inherent rigidity when compared to that of Figs. 1–3.

For sealing the top liner edge 56' against the sealing ring 12', a spring-loaded split ring generally designated 66 is employed, that ring comprising a strip 68 of resilient metal having overlapping ends 70 of reduced width. Overlapping brackets 72 and 74 are secured respectively to the ends of the strip 68 by rivets 76 or the like, each of these brackets having a handle 78 and 80 respectively. A spring 82 is connected between the brackets 72 and 74 so as to cause the strip ends 70 to overlap to an increasing degree, thus causing the strip 68 to contract. When the handles 78 and 80 are grasped and moved toward one another, the strip 68 is caused to expand against the action of the spring 82, which is forcibly extended. The strength of the spring 82 is sufficient so that when the strip 68 in expanded condition has been slipped over the top liner edge 56' and the sealing ring 12' and the handles 78 and 80 are then released, the strip 68 is firmly contracted so as to seal the top liner edge 56' against the sealing strip 12'.

The volume of air which must be exhausted in causing the liner 54 to assume its position shown in Fig. 2 is quite small, and consequently the capacity of the suction source need not be very great. A single unit could well supply the suction or the pressure for a number of utensils made according to the present invention and could be built into or be made an accessory attachable to a household cooking range. Alternatively, in view of the small capacity required, a specially designed motor and pump could be attached to or be built integrally into the utensil 2 itself.

While but two embodiments of the present invention have been here described, it will be apparent that many variations may be made therein, all within the scope of the invention as defined in the following claims.

I claim:

1. A cooking utensil comprising a substantially rigid receptacle for repeated use, said receptacle having an open top through which food may be placed therein, a substantially flat bottom wall to which heat may be applied in order to cook the food, and side walls extending from said bottom wall to said open top, a removable substantially air-impervious somewhat flexible thin metallic liner in said receptacle for temporary use, said liner being of a size to substantially smoothly engage the inner surface of said receptacle over a major portion of the area of said bottom and side walls, initially only roughly conforming to said inner receptacle surface, but adapted to smoothly and uniformly engage said surface with a tight fit, said liner being sufficiently inflexible so that the weight of the contents of said receptacle will not be affected to bring about said tight fit, means engageable with said liner to seal it to said receptacle over a limited area completely therearound, thus defining a sealed space between said liner and said receptacle, a passage in one of said receptacle side walls between the exterior of said receptacle and said sealed space, a suction source, and an operative connection between said suction source and said passage, whereby suction is applied through said passage so as to cause said liner to substantially uniformly engage the inner surface of said receptacle with a tight fit.

2. The cooking utensil of claim 1, in which the inner surface of said receptacle along said sealed space is provided with a plurality of narrow auxiliary passages open at said inner space and communicating with said first named passage.

3. A cooking utensil comprising a substantially rigid receptacle for repeated use, said receptacle having an open top through which food may be placed therein, a substantially flat bottom wall to which heat may be applied in order to cook the food, and side walls extending from said bottom wall to said open top, a removable substantially air-impervious somewhat flexible thin metallic liner in said receptacle for temporary use, said liner being of a size to substantially smoothly engage the inner surface of said receptacle over a major portion of the area of said bottom and side walls, initially only roughly conforming to said inner receptacle surface, but adapted to smoothly and uniformly engage said surface with a tight fit, said liner being sufficiently inflexible so that the weight of the contents of said receptacle will not be affected to bring about said tight fit, means engageable with said liner to seal it to said receptacle over a limited area completely therearound, thus defining a sealed space between said liner and said receptacle, a passage in one of said receptacle side walls between the exterior of said receptacle and said sealed space, a suction source, a pressure source, and an operative connection including a selector valve between said sources and said passage, whereby suction or pressure is selectively applied through said passage so as to cause said liner to substantially uniformly engage the inner surface of said receptacle with a tight fit or to be forcibly separated from said inner surface.

4. The cooking utensil of claim 3, in which the inner surface of said receptacle along said sealed space is provided with a plurality of narrow auxiliary passages open at said inner space and communicating with said first named passage.

5. A cooking utensil comprising a substantially rigid receptacle for repeated use, said receptacle having an open top through which food may be placed therein, a substantially flat bottom wall to which heat may be applied in order to cook the food, and side walls extending from said bottom wall to said open top, a removable substantially air-impervious somewhat flexible thin metallic liner in said receptacle for temporary use, said liner being of a size to substantially smoothly engage the inner surface of said receptacle over a major portion of the area of said bottom and side walls, initially only roughly conforming to said inner receptacle surface, but adapted to smoothly and uniformly engage said surface with a tight fit, said liner being sufficiently inflexible so that the weight of the contents of said receptacle will not be affected to bring about said tight fit, means engageable with said liner to seal it to said receptacle over a limited area completely therearound, thus defining a sealed space between said liner and said receptacle, a passage in one of said receptacle side walls between the exterior of said receptacle and said sealed space, a pressure source, and an operative connection between said source and said passage, whereby pressure is applied through said passage so as to cause said liner to be forcibly separated from said inner surface.

6. The cooking utensil of claim 5, in which the inner surface of said receptacle along said sealed space is provided with a plurality of narrow auxiliary passages open at said inner space and communicating with said first named passage.

7. A cooking utensil comprising a substantially rigid receptacle for repeated use, said receptacle having an open top through which food may be placed therein, a substantially flat bottom wall to which heat may be applied in order to cook the food, side walls extending from said bottom wall to said open top, and a handle extending from said side wall, a removable substantially air-impervious somewhat flexible thin metallic liner in said receptacle for temporary use, said liner being of a size to substantially smoothly engage the inner surface of said receptacle over a major portion of the area of said bottom and side walls, initially only roughly conforming to said inner receptacle surface but adapted to smoothly and uniformly engage said surface with a tight fit, said liner being sufficiently inflexible so that the weight of the contents of said receptacle will not be effective to bring about said tight fit, means engageable with said liner to seal it to said receptacle over a limited area completely therearound, thus defining a sealed space between said liner and said receptacle, a passage through said handle opening inwardly on said sealed space and outwardly at the exterior of said handle, a suction source, and an operative connection between said source and said passage at the exterior of said handle, whereby suction is applied through said passage so as to cause said liner to substantially uniformly engage the inner surface of said receptacle with a tight fit.

8. The cooking utensil of claim 7, in which the inner surface of said receptacle along said sealed space is provided with a plurality of narrow auxiliary passages open at said inner space and communicating with said first named passage.

9. A cooking utensil comprising a substantially rigid receptacle for repeated use, said receptacle having an open top through which food may be placed therein, a substantially flat bottom wall to which heat may be applied in order to cook the food, side walls extending from said bottom wall to said open top, and a handle extending from said side wall, a removable substantially air-impervious somewhat flexible thin metallic liner in said receptacle for temporary use, said liner being of a size to substantially smoothly engage the inner surface of said receptacle over a major portion of the area of said bottom and side walls, initially only roughly conforming to said inner receptacle surface but adapted to smoothly and uniformly engage said surface with a tight fit, said liner being sufficiently inflexible so that the weight of the contents of said receptacle will not be effective to bring about said tight fit, means engageable with said liner to seal it to said receptacle over a limited area completely therearound, thus defining a sealed space between said liner and said receptacle, a passage through said handle opening inwardly on said sealed space and outwardly at the exterior of said handle, a suction source, a pressure source and an operative connection including a selector valve between said sources and said passage at the exterior of said handle, whereby suction or pressure is selectively applied through said passage so as to cause said liner to substantially uniformly engage the inner surface of said receptacle with a tight fit or to be forcibly separated from said inner surface.

10. The cooking utensil of claim 9, in which the inner surface of said receptacle along said sealed space is provided with a plurality of narrow auxiliary passages open at said inner space and communicating with said first named passage.

11. A cooking utensil comprising a substantially rigid receptacle for repeated use, said receptacle having an open top through which food may be placed therein, a substantially flat bottom wall to which heat may be applied in order to cook the food, side walls extending from said bottom wall to said open top, and a handle extending from said side wall, a removable substantially air-impervious somewhat flexible thin metallic liner in said receptacle for temporary use, said liner being of a size to substantially smoothly engage the inner surface of said receptacle over a major portion of the area of said bottom and side walls, initially only roughly conforming to said inner receptacle surface but adapted to smoothly and uniformly engage said surface with a tight fit, said liner being sufficiently inflexible so that the weight of the contents of said receptacle will not be effective to bring about said tight fit, means engageable with said liner to seal it to said receptacle over a limited area completely therearound, thus defining a sealed space between said liner and said receptacle, a passage through said handle opening inwardly on said sealed space and outwardly at the exterior of said handle, a pressure source, and an operative connection between said source and said passage at the exterior of said handle, whereby pressure is applied through said passage so as to cause said liner to be forcibly separated from said inner surface.

12. The cooking utensil of claim 11, in which the inner surface of said receptacle along said sealed space is provided with a plurality of narrow auxiliary passages open at said inner space and communicating with said first named passage.

References Cited in the file of this patent

UNITED STATES PATENTS

| | | |
|---|---|---|
| 1,245,670 | Brown | Nov. 6, 1917 |
| 1,290,378 | Sibley | Jan. 7, 1919 |
| 1,928,424 | Hopgood | Sept. 26, 1933 |
| 2,113,728 | Harrison | Apr. 12, 1938 |
| 2,174,425 | Schlumbohm | Sept. 26, 1939 |
| 2,321,836 | Marzo | June 15, 1943 |
| 2,346,423 | Gray | Apr. 11, 1944 |
| 2,511,481 | Schneider | June 13, 1950 |
| 2,597,715 | Erikson | May 20, 1952 |
| 2,604,227 | Carriker | July 22, 1952 |
| 2,678,764 | Carlson | May 18, 1954 |

FOREIGN PATENTS

| | | |
|---|---|---|
| 430,256 | Great Britain | June 17, 1935 |